United States Patent [19]

Evans et al.

[11] Patent Number: 5,119,103
[45] Date of Patent: Jun. 2, 1992

[54] METHOD OF STEERING THE GAIN OF A MULTIPLE ANTENNA GLOBAL POSITIONING SYSTEM RECEIVER

[75] Inventors: Alan G. Evans, LaPlata, Md.; Bruce R. Hermann, Fredericksburg, Va.

[73] Assignee: The United States of America as represented by the Secretary of the Navy, Washington, D.C.

[21] Appl. No.: 621,685

[22] Filed: Nov. 16, 1990

[51] Int. Cl.$^5$ .......................... G01S 5/02; H04B 7/85
[52] U.S. Cl. .................................... 342/423; 342/354
[58] Field of Search ............... 342/352, 354, 357, 383, 342/424, 422, 423

[56] References Cited

U.S. PATENT DOCUMENTS 4,797,677  1/1989  MacDoran et al. ............... 342/352
4,996,532  2/1991  Kirimoto et al. .................. 342/81

OTHER PUBLICATIONS

Isley et al., "ATS-6 Interferometer", IEEE Trans. on Aerospace and Elec. Systems, vol. AES-11, No. 6, pp. 1165-1169, Nov. 1975.
Spilker et al., "The Delay Lock Discriminator—An Optimum Tracking Device", Proc of the IRE, pp. 1403-1406, Sep. 1961.

Primary Examiner—Gregory C. Issing
Attorney, Agent, or Firm—John D. Lewis; Kenneth E. Walden

[57] ABSTRACT

A method for steering the gain of a multiple antenna Global Positioning System (GPS) receiver toward a plurality of a GPS satellites simultaneously is provided. The GPS signals of a known wavelength are processed digitally for a particular instant in time. A range difference or propagation delay between each antenna for GPS signals received from each satellite is first resolved. The range difference consists of a fractional wavelength difference and an integer wavelength difference. The fractional wavelength difference is determined by each antenna's tracking loop. The integer wavelength difference is based upon the known wavelength and separation between each antenna with respect to each satellite position. The range difference is then used to digitally delay the GPS signals at each antenna with respect to a reference antenna. The signal at the reference antenna is then summed with the digitally delayed signals to generate a composite antenna gain. The method searches for the correct number of integer wavelengths to maximize the composite gain. The range differences are also used to determine the attitude of the array.

7 Claims, 3 Drawing Sheets

METHOD OF STEERING THE GAIN OF A MULTIPLE ANTENNA GLOBAL POSITIONING SYSTEM RECEIVER

ORIGIN OF THE INVENTION

The invention described herein was made in the performance of official duties by employees of the Department of the Navy and may be manufactured, used, licensed by and for the Government for any governmental purposes without payment of any royalties thereon.

FIELD OF THE INVENTION

The invention relates to a method of satellite navigation and more particularly to a method of steering the composite antenna gain of a multiple antenna Global Positioning System (GPS) receiver.

BACKGROUND OF THE INVENTION

The Global Positioning System (GPS) is now well-known in the field of navigation. A brief description of the GPS will however be provided with reference to FIG. 1 where the earth rotates about its north-south axis 16 in the manner shown. The GPS constellation is made up of a plurality of twenty four (24) satellites 18 placed in six planes equally spaced about the earth. In each plane 20 will be three or four satellites more or less equally spaced in the plane. Each satellite in the plane is arranged to exhibit a nearly-circular orbital path about the earth at an altitude of about 20,000 kilometers. Each plane 20 is disposed in angular and spatial relation to each of the other five planes thereby forming an angle of approximately 60 degrees between adjacent planes. At the same time, each plane 20 is disposed in angular relation to the equatorial plane to form an angle of about 55 degrees therebetween. The time required for a satellite to travel in its planar orbit about the earth is approximately twelve sidereal hours.

The primary electrical power for each satellite is provided by solar cells and rechargeable batteries. Only during eclipses are the batteries used exclusively. The satellites transmit a pair of encoded signals at predetermined L-band frequencies at $L_1$: 1575.42 megaHertz (MHz) and $L_2$: 1227.60 MHz. One reason for utilizing a pair of signals from each satellite is to compensate for the adverse effects of the ionosphere on the determination of the range. The transmitted signal frequencies are a multiple of the 10.23 MHz primary frequency reference contained in each satellite. This frequency reference may be either a Cesium or Rubidium atomic frequency standard. The signals transmitted by the satellites consist of two codes: the coarse code C which repeats every millisecond, and the precise code P which repeats each week. Attached to each of these codes is the navigation message, a 50 bits/second data stream containing the predicted satellite ephemeris and clock corrections and other information. Each GPS satellite is assigned its own unique code by which it is identified; this is called Code Division Multiple Access. The user's receiver can select the satellites to track by selecting the appropriate code numbers and generating the corresponding code sequence.

The GPS is being developed as a world-wide, all weather, space based navigation system for military and civilian applications. For most users, operating under quiescent conditions, the current generation of GPS receivers and controlled radiation pattern antennas are adequate. However, when conditions include high multipath environments, high radio frequency interference due to close proximity to radar, field of view blockage due to a ship's structure, a rolling and pitching platform during severe weather, and/or jamming, the low power level of the GPS signals causes current GPS receivers to operate at a reduced efficiency.

SUMMARY OF THE INVENTION

Accordingly, it is an object of the present invention to provide a method of enhancing the performance of a GPS antenna and receiver system under all operating conditions.

Another object of the present invention is to provide a method of steering the gain of a GPS antenna and receiver system.

Still another object of the present invention is to provide a method of determining the attitude of a GPS antenna platform.

Other objects and advantages of the present invention will become more obvious hereinafter in the specification and drawings.

In accordance with the present invention, a method is provided for steering the gain of a multiple antenna Global Positioning System (GPS) receiver toward a plurality of GPS satellites simultaneously. A plurality of antenna elements having fixed relative positions form an antenna array. The GPS signals of a known wavelength $\lambda$ are received at each antenna from each satellite. The signals are digitized such that, at any instant in time, a difference in range can be determined from each satellite to each antenna pair in the array. Each of the range differences is related to a propagation delay that is defined or represented by an integer number of wavelengths and a fractional number of wavelengths. Since the wavelength of the GPS signals is known, the fractional number of wavelengths can be easily determined from each antenna's tracking loop. For each satellite and antenna pair, the integer number of wavelengths is selected to maximize the gain of the antenna array toward that satellite. Selection is based upon the known wavelength $\lambda$ and the fixed relative position of each antenna in the array. In this way, the gain of the antenna array is steered towards the plurality of GPS satellites simultaneously.

DETAILED DESCRIPTION OF THE INVENTION

Figure 1:
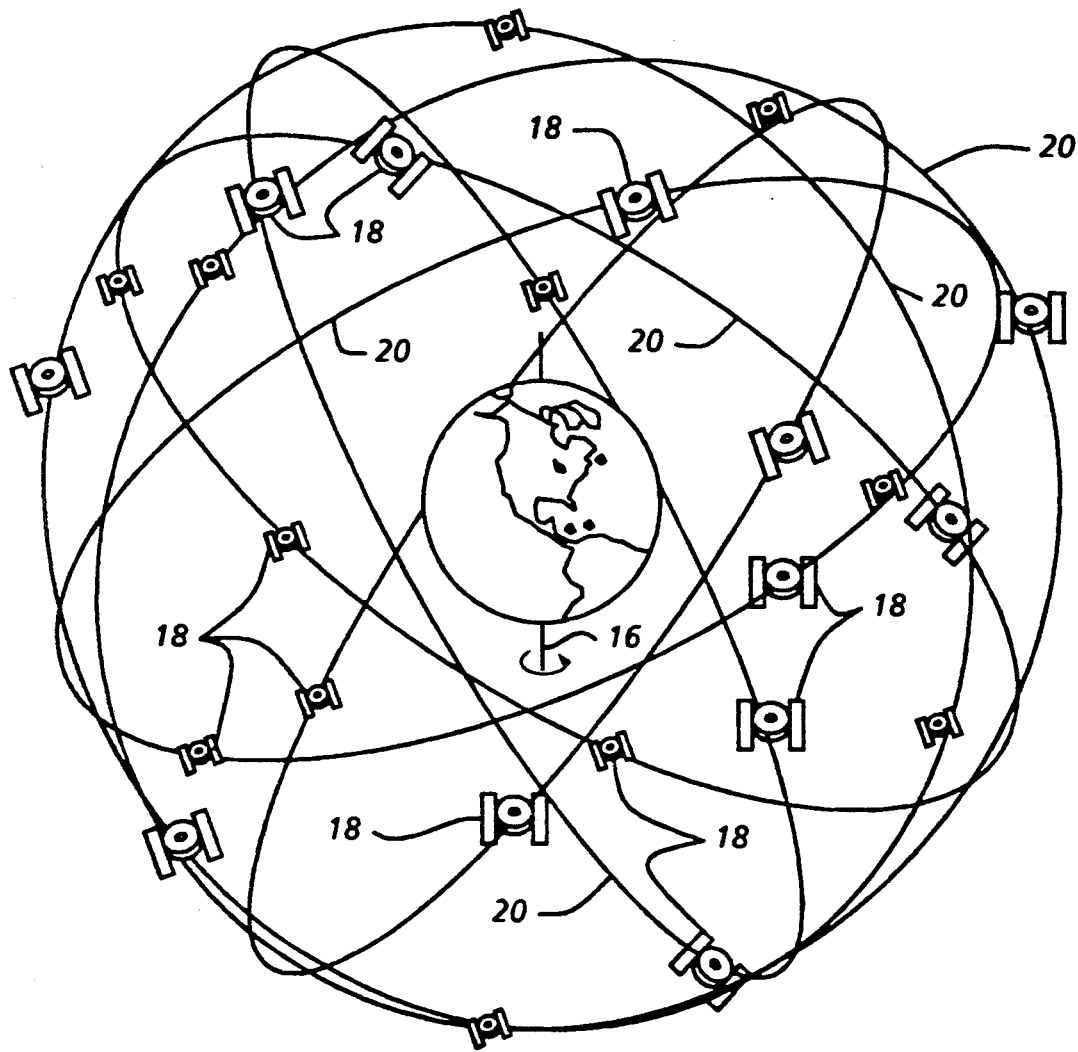
FIG. 1 is a diagrammatic view of the Global Positioning System (GPS) used by the method of the present invention.
Figure 2:
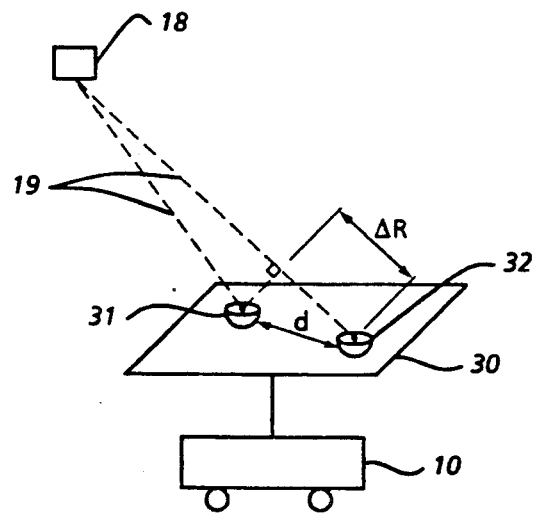
FIG. 2 is a diagrammatic view of a two-antenna array receiving GPS signals.

Referring again to the drawings and in particular to FIG. 2, a two-antenna array 30 is shown receiving GPS signals 19 of a known wavelength $\lambda$ from a single GPS satellite 18. Antennas 31 and 32 of array 30 are in a fixed relationship to one another and are separated by a distance d. Typically, antenna array 30 is mounted on a platform 10 which may be a moving platform as shown. For sake of simplicity, the method of the present invention will be described for the two-antenna array 30 and single satellite 18. However, it is to be understood that the method extends to larger antenna arrays receiving GPS signals from a plurality of GPS satellites.

As shown in FIG. 2, a difference in range $\Delta R$ between satellite 18 and antennas 31 and 32 results from the separation distance d. The difference in range $\Delta R$ is a propagation time delay between antennas 31 and 32. Since the wavelength $\lambda$ of GPS signals 19 is known, the propagation time delay can be represented by a number of integer cycles plus a fractional portion of a cycle. To better explain this concept, reference will now be made to FIG. 3 where $\Delta R$ is shown at a particular instant in time.

Figure 3:
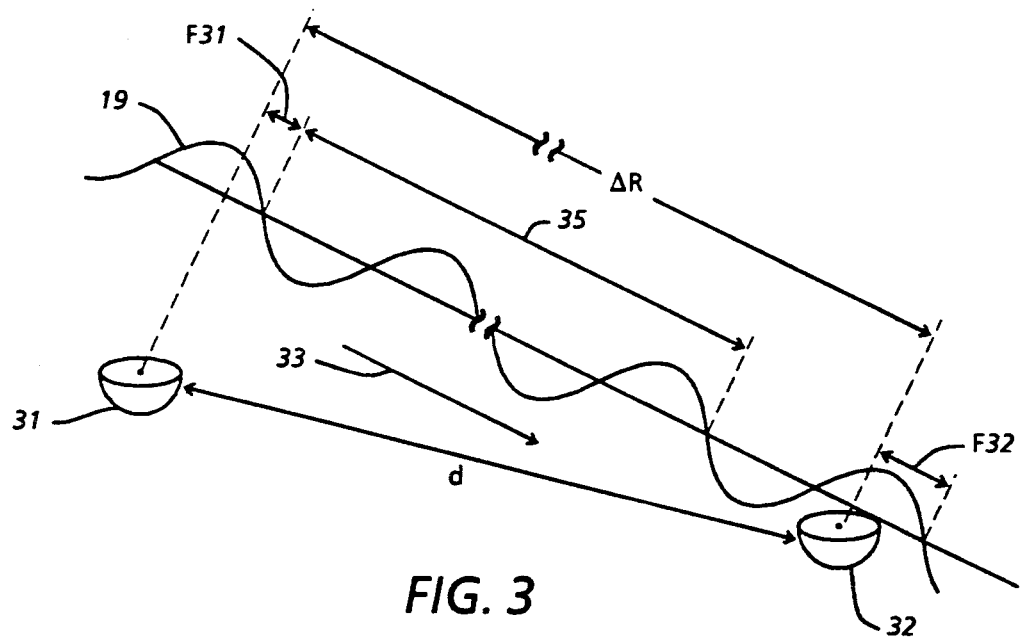
FIG. 3 is a graphic view of the range difference $\Delta R$ for the GPS signals received by the antenna array of FIG. 2 at a particular instant in time.

In FIG. 3, GPS signal 19 is propagating along the direction of arrow 33. The difference in range $\Delta R$ caused by separation d consists of an unknown number of integer cycles of wavelength $\lambda$, indicated by reference numeral 35, and a fractional portion of an integer cycle. The fractional portion of $\Delta R$ is the difference between the fractional portion $F_{31}$ at antenna 31 and the fractional portion $F_{32}$ at antenna 32. Measurement of each fractional portion $F_{31}$ and $F_{32}$ is accomplished by each antenna's tracking loop as is well-known in the art.

In order to maximize or steer the gain of antenna array 30, it is necessary to know how many integer cycles 35 exist at the instant in time shown in FIG. 3. Once this is known, it is possible to delay the signals received by each antenna in an antenna array 30 so that the gain pattern may be developed to resemble a single phased array antenna. Naturally, it is desirable to make the integer cycle resolution as fast as possible.

In the preferred embodiment of the present invention, the number of integer cycles 35 is determined based upon the known wavelength $\lambda$ of GPS signals 19 and the separation distance d. By way of example, it may be assumed that separation distance d is nominally 1 meter. For the GPS system, the known wavelength $\lambda$ is equal to 0.192 meters. The number of integer cycles 35 is dependent upon the relative position of antennas 31 and 32 with respect to a particular GPS satellite 18 whose position relative to the array may be unknown. In practice, one of the antennas in array 30 is chosen as a reference antenna.

Figure 4:
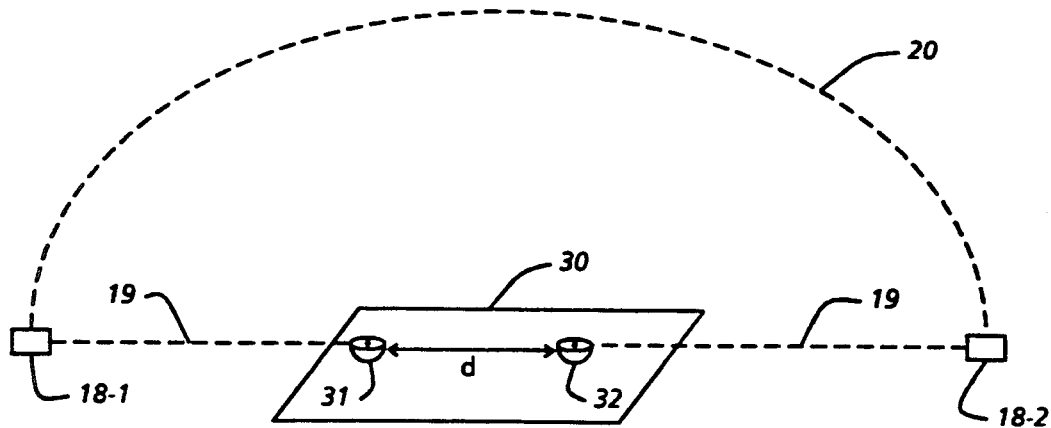
FIG. 4 is a diagrammatic view of the two-antenna array in relation to a single GPS satellite in one of two extreme relative positions.

As shown in FIG. 4, satellite 18 may be propagating from position 18-1, position 18-2, or any other position in between and along its orbiting plane 20 with respect to antenna array 30. By way of example, antenna 31 is chosen as a reference antenna. Accordingly, in the two extreme positions 18-1 and 18-2, the possible number of integer cycles n, lies in the range of:

$$-\left|\frac{d}{\lambda}\right| \leq n \leq \left|\frac{d}{\lambda}\right|. \quad (1)$$

If d=1 meter and $\lambda$=0.192 meters, the possible number of integer cycles is eleven. The method of determining the correct value of n will now be described with the aid of the flow diagram of FIG. 5.

Figure 5:
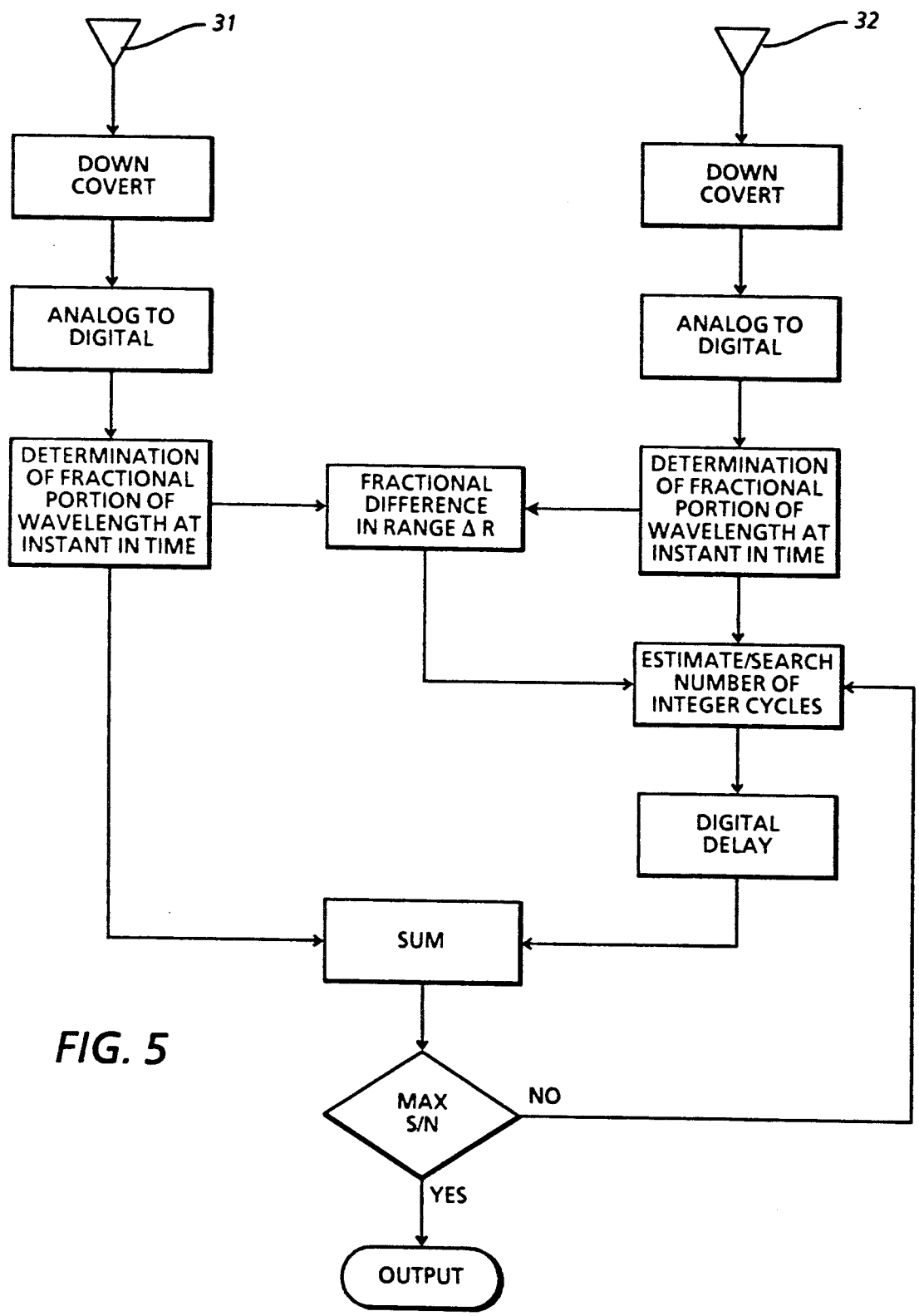
FIG. 5 is a flow diagram of the method of the present invention.

In FIG. 5, each GPS signal from the plurality of GPS satellites received by antennas 31 and 32 is first down converted from an extremely high frequency to a baseband frequency of approximately 10 MHz. While the following description focuses on GPS signals from one satellite, the method holds true and is repeated for each of the plurality of GPS satellites. The baseband signals are converted from analog to digital in order to process the signals. Typically, digitization of the received signals is accomplished by well known numerical interpolation methods. At a particular instant, the fractional portion of the wavelength of a GPS signal is determined by the respective antenna's tracking loop as discussed above. At the same instant, an estimate is made of the number of integer cycles -between the reference antenna (antenna 31 in this example) and antenna 32. For a larger array, this processing takes place for each antenna in the array relative to reference antenna 31.

The fractional portion at each antenna 31 and 32 is used to determine the fractional difference in range $\Delta R$. This fractional difference along with the estimate of the integer number of cycles is used to digitally delay the GPS signal received at antenna 32. One method of accomplishing this time delay is to phase delay the clock signal that controls the digitization of the received signals. The delayed signal is then summed with the signal received by reference antenna 31. The signal-to-noise ratio may be monitored to determine if the estimated integer number of cycles yields a maximum gain for the antenna array 30. If not, a search for the correct number of integer cycles is made based upon equation (1) above. Since only a relatively small number of integer values need be processed, the method of the present invention approaches the integer resolution problem very quickly. Accordingly, the gain of the antenna array can be maximized quickly yielding an output that resembles a single phased antenna array. As the array increases in size, parallel processing techniques may be used so that the above described processing will occur simultaneously for each antenna receiving GPS signals from several GPS satellites.

The advantages of the present invention are numerous. A simple method of steering the gain of a multiple/antenna GPS receiver is provided. The result is a multiple antenna array that acts like a single phased antenna array. The maximum gain is achieved by searching for the correct number of integer cycles of a known wavelength to determine the propagation delay between antenna elements in the array. The maximum gain is realized when a signal-to-noise ratio is maximized. Alternatively, a cross correlation product may be used. Another advantage of the present invention is its ability to be used for attitude determination of the array 30. This can be accomplished using the propagation delays already determined.

Naturally, it will be understood by those skilled in the art that the above description of the present invention is susceptible to various modifications, changes and adaptations and that the same are intended to be comprehended within the meaning and range of equivalence of the appended claims.

What is claimed is:

1. In a Global Positioning System (GPS) receiver system having a plurality of antenna elements arranged in an array, a method of steering the gain of the antenna array toward a plurality of GPS satellites simultaneously comprises the steps of:

fixing the antennas in the array wherein a known separation distance exists between each of the antennas;

receiving GPS signals of known wavelengths $\lambda$ at each antenna from each satellite;

digitizing the GPS signals are received at each antenna;

selecting one antenna as a reference antenna;

determining a propagation delay between each antenna and the reference antenna for each satellite, each propagation delay being the propagation time difference between each antenna and the reference antenna, each propagation delay further corresponding to a fractional wavelength delay and an integer wavelength delay n, wherein the fractional wavelength delay at each antenna is based on each antenna's tracking loop and the integer wavelength delay n at each antenna is based on the known wavelength of the GPS signal and the separation distance d between the reference antenna and each antenna, and wherein the integer wavelength delay n is selected from the range $-|d/\lambda| \leq n \leq |d/\lambda|$ so that the gain of the array is directed toward each of the plurality of satellites whereby a signal-to-noise ratio or cross correlation product is maximized;

delaying the digitized signals received at each antenna by the respective antenna propagation delay for each satellite; and processing the delayed digitized signals from each antenna to simultaneously steer the gain of the antenna array toward each of the satellites in view of the antenna array.

2. A method as in claim 1 wherein each propagation delay between each antenna and the reference antenna is obtained for each satellite from the position of: (1) each antenna with respect to the reference antenna and (2) the plurality of satellites with respect to the reference antenna.

3. A method as in claim 1 further comprising the step of multiplying each propagation delay by the speed of light to determine a relative range difference between each antenna and the reference antenna wherein the relative range difference for the antenna array is used to determine the attitude of the array.

4. A method according to claim 1 wherein said step of digitizing includes the step of down converting the frequency of the received GPS signals to a baseband frequency wherein the frequency of the received GPS signals is a multiple of the baseband frequency.

5. In a Global Positioning System (GPS) receiver system having a plurality of antenna elements arranged in an array, a method of steering the gain of the antenna array toward a plurality of GPS satellites simultaneously, comprising the steps of:

fixing the antennas in the array wherein relative positions of each antenna are fixed and known;

receiving GPS signals of known wavelength $\lambda$ at each antenna from each satellite;

determining, at an instant in time, a difference in range from each satellite to each antenna in the array, each range difference represented by an integer number of cycles of wavelength $\lambda$ and a fractional number of cycles of wavelength $\lambda$;

measuring the fractional number of cycles based upon each antenna's tracking loop; and selecting the integer number of cycles to maximize the gain of the antenna array based upon the known wavelength $\lambda$ and the fixed and known relative positions of each antenna in the array wherein the integer and fractional number of cycles are used to establish the attitude of the array.

6. A method as in claim 1 wherein said step of digitizing comprises the step of performing a numerical interpolation of the GPS signals.

7. A method as in claim 1 wherein said step of digitizing is controlled by a clock signal and wherein said step of delaying comprises the step of phase delaying the clock signal.

* * * * *